(12) United States Patent
Procopio et al.

(10) Patent No.: US 9,536,199 B1
(45) Date of Patent: Jan. 3, 2017

(54) RECOMMENDATIONS BASED ON DEVICE USAGE

(71) Applicant: Google Inc., Mountian View, CA (US)

(72) Inventors: Michael Jeffrey Procopio, Boulder, CO (US); Robert Brett Rose, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 361 days.

(21) Appl. No.: 14/299,283

(22) Filed: Jun. 9, 2014

(51) Int. Cl.
  *G06F 17/00* (2006.01)
  *G06N 5/02* (2006.01)
  *G06N 5/04* (2006.01)

(52) U.S. Cl.
  CPC ........................................ *G06N 5/04* (2013.01)

(58) Field of Classification Search
  USPC .......................................................... 706/46
  See application file for complete search history.

(56) References Cited

U.S. PATENT DOCUMENTS

| | | |
|---|---|---|
| 5,579,471 A | 11/1996 | Barber et al. |
| 6,006,239 A | 12/1999 | Bhansali et al. |
| 6,009,405 A | 12/1999 | Leymann et al. |
| 6,119,165 A | 9/2000 | Li et al. |
| 6,314,105 B1 | 11/2001 | Luong |
| 6,449,688 B1 | 9/2002 | Peters et al. |
| 6,507,845 B1 | 1/2003 | Cohen et al. |
| 6,590,568 B1 | 7/2003 | Astala et al. |
| 6,614,804 B1 | 9/2003 | McFadden et al. |
| 6,687,735 B1 | 2/2004 | Logston et al. |
| 6,711,557 B1 | 3/2004 | Palaniappan |
| 6,947,396 B1 | 9/2005 | Salmi |
| 7,030,861 B1 | 4/2006 | Westerman et al. |

(Continued)

FOREIGN PATENT DOCUMENTS

| | | |
|---|---|---|
| EP | 0371608 | 6/1990 |
| EP | 1275222 | 1/2003 |

(Continued)

OTHER PUBLICATIONS

Analysis of user demand patterns and locality for YouTube traffic Åke Arvidsson; Manxing Du; Andreas Aurelius; Maria Kihl Teletraffic Congress (ITC), 2013 25th International Year: 2013 pp. 1-9, DOI: 10.1109/ITC.2013.6662935 IEEE Conference Publications.*

(Continued)

*Primary Examiner* — Michael B Holmes
(74) *Attorney, Agent, or Firm* — Young Basile Hanlon & MacFarlane, P.C.

(57) ABSTRACT

A method includes receiving, at a storage device, a plurality of data files that each have a file size, and are each associated a respective device that corresponds to one of a plurality of device types and defining device type pairs each including a first device and a second device having different device types. The method also includes determining, by one or more computing devices and for each device type pair, an engagement score based at least in part on the file sizes for the data files associated with the first device and the second device, wherein the engagement score represents a degree of usage of the first device concurrent with usage of the second device, and generating, by the one or more computing devices.

18 Claims, 7 Drawing Sheets

(56) References Cited

U.S. PATENT DOCUMENTS

| | | | |
|---|---|---|---|
| 7,113,917 B2 | 9/2006 | Jacobi et al. |
| 7,146,377 B2 | 12/2006 | Nowicki et al. |
| 7,386,576 B2 | 6/2008 | Watanabe et al. |
| 7,536,386 B2 | 5/2009 | Samji et al. |
| 7,620,902 B2 | 11/2009 | Manion et al. |
| 7,660,902 B2 | 2/2010 | Graham et al. |
| 7,711,771 B2 | 5/2010 | Kirnos |
| 7,756,821 B2 | 7/2010 | Havens et al. |
| 7,821,405 B2 | 10/2010 | Heidloff et al. |
| 7,827,299 B2 | 11/2010 | Cadarette et al. |
| 7,904,303 B2 | 3/2011 | Chien et al. |
| 7,908,183 B2 | 3/2011 | Jacobi et al. |
| 7,945,600 B1 | 5/2011 | Thomas et al. |
| 8,041,672 B2 | 10/2011 | Ogawa et al. |
| 8,132,111 B2 | 3/2012 | Baron et al. |
| 8,156,059 B2 | 4/2012 | Dunning et al. |
| 8,194,986 B2 | 6/2012 | Conwell |
| 8,196,047 B2 | 6/2012 | Fisher et al. |
| 8,285,700 B2 | 10/2012 | Steelberg et al. |
| 8,298,087 B1 | 10/2012 | Smith |
| 8,407,613 B2 | 3/2013 | Hope |
| 8,412,731 B2 | 4/2013 | Aubert et al. |
| 8,417,000 B1 | 4/2013 | Mendis |
| 8,429,565 B2 | 4/2013 | Agarawala et al. |
| 8,458,174 B1 | 6/2013 | Duerig |
| 8,464,184 B1 | 6/2013 | Cook et al. |
| 8,467,955 B2 | 6/2013 | Jiang et al. |
| 8,468,164 B1 | 6/2013 | Paleja et al. |
| 8,479,122 B2 | 7/2013 | Hotelling et al. |
| 8,504,565 B2 | 8/2013 | Pitts |
| 8,522,230 B2 | 8/2013 | Nathan et al. |
| 8,522,258 B1 | 8/2013 | Shaw |
| 8,532,400 B1 | 9/2013 | Babenko et al. |
| 8,547,352 B2 | 10/2013 | Park et al. |
| 8,548,844 B2 | 10/2013 | Steelberg et al. |
| 8,555,173 B2 | 10/2013 | Kast |
| 8,560,975 B2 | 10/2013 | Beaver et al. |
| 8,571,331 B2 | 10/2013 | Cifarelli |
| 8,584,022 B1 | 11/2013 | O'Shaughnessy et al. |
| 8,612,439 B2 | 12/2013 | Prahlad et al. |
| 8,612,470 B1 | 12/2013 | Fushman et al. |
| 8,624,836 B1 | 1/2014 | Miller et al. |
| 8,638,312 B2 | 1/2014 | Lim |
| 8,644,688 B2 | 2/2014 | Fishman et al. |
| 8,661,053 B2 | 2/2014 | Flynn et al. |
| 8,670,597 B2 | 3/2014 | Petrou et al. |
| 8,983,888 B2* | 3/2015 | Nice ................. G06N 5/02 703/2 |
| 9,177,255 B1* | 11/2015 | Procopio ............ G06F 8/00 |
| 9,256,637 B2* | 2/2016 | Rose ............ G06F 17/30867 |
| 9,262,420 B1* | 2/2016 | Schoeffler ...... G06F 17/30864 |
| 9,268,802 B2* | 2/2016 | Procopio .......... G06F 17/30292 |
| 9,292,280 B2* | 3/2016 | Cairns ............. G06F 9/44505 |
| 9,317,522 B2* | 4/2016 | Schoeffler ........ G06F 17/30194 |
| 9,317,709 B2* | 4/2016 | Procopio .......... G06F 21/6218 |
| 9,336,278 B2* | 5/2016 | Procopio ........... G06F 17/3053 |
| 9,363,632 B2* | 6/2016 | Rose ................ H04W 4/02 |
| 9,390,141 B2* | 7/2016 | Procopio .......... G06F 17/3053 |
| 9,413,739 B1* | 8/2016 | Rose ................ H04L 63/08 |
| 9,430,578 B2* | 8/2016 | Schoeffler .......... G06F 17/3089 |
| 9,489,430 B2* | 11/2016 | Procopio .......... G06F 17/30554 |
| 2002/0054117 A1 | 5/2002 | van Dantzich et al. |
| 2002/0099844 A1 | 7/2002 | Baumann et al. |
| 2002/0112116 A1 | 8/2002 | Nelson |
| 2002/0116399 A1 | 8/2002 | Camps et al. |
| 2002/0167538 A1 | 11/2002 | Bhetanabhotla |
| 2002/0178271 A1 | 11/2002 | Graham et al. |
| 2002/0184375 A1 | 12/2002 | Wagner et al. |
| 2003/0184653 A1 | 10/2003 | Ohkubo |
| 2003/0208490 A1 | 11/2003 | Larrea et al. |
| 2004/0135904 A1 | 7/2004 | Shiota et al. |
| 2004/0189707 A1 | 9/2004 | Moore et al. |
| 2005/0033777 A1 | 2/2005 | Moraes et al. |
| 2005/0131992 A1 | 6/2005 | Goldstein et al. |
| 2006/0059174 A1 | 3/2006 | Mese et al. |
| 2006/0159127 A1 | 7/2006 | Childress et al. |
| 2006/0229932 A1 | 10/2006 | Zollo et al. |
| 2006/0242581 A1 | 10/2006 | Manion et al. |
| 2007/0250401 A1 | 10/2007 | Hearn et al. |
| 2008/0123904 A1 | 5/2008 | Sakamoto et al. |
| 2008/0126476 A1 | 5/2008 | Nicholas et al. |
| 2008/0165141 A1 | 7/2008 | Christie |
| 2008/0177623 A1 | 7/2008 | Fritsch et al. |
| 2008/0195956 A1 | 8/2008 | Baron et al. |
| 2008/0270398 A1 | 10/2008 | Landau et al. |
| 2009/0112868 A1 | 4/2009 | Rajamani et al. |
| 2009/0327975 A1 | 12/2009 | Stedman |
| 2010/0017426 A1 | 1/2010 | Marston |
| 2010/0046392 A1 | 2/2010 | Childress et al. |
| 2010/0070707 A1 | 3/2010 | Nishimura |
| 2010/0161441 A1 | 6/2010 | Hounsell |
| 2010/0211575 A1 | 8/2010 | Collins et al. |
| 2010/0241971 A1 | 9/2010 | Zuber |
| 2010/0250337 A1 | 9/2010 | Kassaei |
| 2010/0251305 A1 | 9/2010 | Kimble et al. |
| 2010/0256981 A1 | 10/2010 | Nielsen et al. |
| 2010/0332846 A1 | 12/2010 | Bowden et al. |
| 2010/0332958 A1 | 12/2010 | Weinberger et al. |
| 2011/0010672 A1 | 1/2011 | Hope |
| 2011/0044512 A1 | 2/2011 | Bambha et al. |
| 2011/0208668 A1 | 8/2011 | Phillips |
| 2011/0289423 A1 | 11/2011 | Kim et al. |
| 2012/0032436 A1 | 2/2012 | Zantout et al. |
| 2012/0072449 A1 | 3/2012 | Patch et al. |
| 2012/0078845 A1 | 3/2012 | Kasbekar et al. |
| 2012/0084689 A1 | 4/2012 | Ledet et al. |
| 2012/0089610 A1 | 4/2012 | Agrawal et al. |
| 2012/0096046 A1 | 4/2012 | Kucera |
| 2012/0136936 A1 | 5/2012 | Quintuna |
| 2012/0192086 A1 | 7/2012 | Ghods et al. |
| 2012/0197980 A1 | 8/2012 | Terleski et al. |
| 2012/0213404 A1 | 8/2012 | Steiner |
| 2012/0233227 A1 | 9/2012 | Alexander et al. |
| 2012/0254332 A1 | 10/2012 | Irvin |
| 2012/0290609 A1 | 11/2012 | Britt |
| 2012/0290926 A1 | 11/2012 | Kapadia et al. |
| 2012/0290947 A1 | 11/2012 | Baggett et al. |
| 2012/0303477 A1 | 11/2012 | Ben-Itzhak |
| 2012/0303684 A1 | 11/2012 | Sakurai et al. |
| 2012/0324368 A1 | 12/2012 | Putz et al. |
| 2013/0014023 A1 | 1/2013 | Lee et al. |
| 2013/0024464 A1 | 1/2013 | Berner et al. |
| 2013/0073976 A1 | 3/2013 | McDonald et al. |
| 2013/0080940 A1 | 3/2013 | Reeves et al. |
| 2013/0104080 A1 | 4/2013 | Bosworth et al. |
| 2013/0132896 A1 | 5/2013 | Lee et al. |
| 2013/0138674 A1 | 5/2013 | Jeong et al. |
| 2013/0138685 A1 | 5/2013 | Brucher et al. |
| 2013/0173637 A1 | 7/2013 | Kim et al. |
| 2013/0185292 A1 | 7/2013 | Li et al. |
| 2013/0185638 A1 | 7/2013 | Tischer |
| 2013/0188886 A1 | 7/2013 | Petrou et al. |
| 2013/0202198 A1 | 8/2013 | Adam et al. |
| 2013/0263289 A1 | 10/2013 | Vijayan et al. |
| 2013/0339435 A1 | 12/2013 | De Armas |
| 2014/0019317 A1 | 1/2014 | Casares et al. |
| 2014/0019910 A1 | 1/2014 | Kim et al. |
| 2014/0029798 A1 | 1/2014 | Flynn et al. |
| 2014/0067702 A1 | 3/2014 | Rathod |
| 2014/0068443 A1 | 3/2014 | Eng et al. |
| 2014/0164535 A1 | 6/2014 | Lynch et al. |
| 2014/0236722 A1 | 8/2014 | Rathus et al. |
| 2014/0317552 A1 | 10/2014 | Romatoski |
| 2015/0193521 A1 | 7/2015 | Schoeffler et al. |
| 2015/0363062 A1 | 12/2015 | Gunn |
| 2015/0363640 A1 | 12/2015 | Meyer |

FOREIGN PATENT DOCUMENTS

| | | |
|---|---|---|
| EP | 2187322 A1 | 5/2010 |
| EP | 2458512 | 5/2012 |
| WO | WO0051021 | 8/2000 |
| WO | WO03090096 | 10/2003 |

(56) References Cited

FOREIGN PATENT DOCUMENTS

| WO | WO2007085083 | 8/2007 |
|---|---|---|
| WO | WO2009032712 | 3/2009 |
| WO | WO2012092025 | 7/2012 |

OTHER PUBLICATIONS

A Simplified 3D Gaze Tracking Technology with Stereo Vision Ke Zhang; Xinbo Zhao; Zhong Ma; Yi Man Optoelectronics and Image Processing (ICOIP), 2010 International Conference on Year: 2010, vol. 1 pp. 131-134, DOI: 10.1109/ICOIP.2010.346 IEEE Conference Publications.*

Automatic Album Maker Moment.me Arrives on Android, Adds a "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.

Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.

ISR and Written Opinion of the International Searching Authority for International Application No. PCT/US2015010618, Mar. 25, 2015.

Larson, Michael, "Probing Network Characteristics: A Distributed Network Performance Framework", Dr. Dobb's Journal, Jun. 2004, pp. 22-29.

Lowe, D., "Object recognition from local scale-invariant features," International Conference on Computer Vision Corfu, Greece (Sep. 1999) pp. 1150-1157.

ISR & Written Opinion, RE: Application # PCT/US2015/020375; Jun. 12, 2015.

ISR & Written Opinion, RE: Application #PCT/US2015/020378 citing new art; Aug. 18, 2015.

* cited by examiner

RECOMMENDATIONS BASED ON DEVICE USAGE

BACKGROUND

Cloud-based file storage systems provide server-based file storage that is accessible via any internet connected device. These systems are often used in conjunction with internet-connected devices such as phones and tablet computers. As an example, mobile and web-based software applications that are executed and/or used with devices such as phones and tablet computers often create and save data directly to cloud-based file storage systems. Peripheral devices and accessory devices with more specialized functions are beginning to adopt this cloud-based storage paradigm as well. As one example, a document scanner could scan a document directly to a user's account at a cloud-based file storage system. As another example, a memory card reader could automatically upload the contents of a camera's memory card to the user's account at the cloud-based file storage system. Other examples of devices that could utilize cloud-based file storage include sports equipment, home automation devices, in-vehicle monitoring devices, and personal fitness devices.

SUMMARY

The disclosure relates generally to recommendations made based on usage of one or more devices by a user.

One aspect of the disclosed embodiments is a method that includes receiving, at a storage device, a plurality of data files that each have a file size, and are each associated a respective device that corresponds to one of a plurality of device types and defining device type pairs each including a first device and a second device having different device types. The method also includes determining, by one or more computing devices and for each device type pair, an engagement score based at least in part on the file sizes for the data files associated with the first device and the second device, wherein the engagement score represents a degree of usage of the first device concurrent with usage of the second device, and generating, by the one or more computing devices Another aspect of the disclosed embodiments is a non-transitory computer-readable storage device including program instructions executable by one or more processors that, when executed, cause the one or more processors to perform operations. The operations include receiving, at a storage device, a plurality of data files that each have a file size, and are each associated a respective device that corresponds to one of a plurality of device types, and defining device type pairs each including a first device and a second device having different device types. The operations also include determining, for each device type pair, an engagement score based at least in part on the file sizes for the data files associated with the first device and the second device, wherein the engagement score represents a degree of usage of the first device concurrent with usage of the second device, and generating a recommendation message based on the engagement scores for one or more of the device type pairs.

Another aspect of the disclosed embodiments is an apparatus that includes one or more processors and one or more memory devices for storing program instructions used by the one or more processors. The program instructions, when executed by the one or more processors, cause the one or more processors to: receive, at a storage device, a plurality of data files that each have a file size, and are each associated a respective device that corresponds to one of a plurality of device types; define device type pairs each including a first device and a second device having different device types; determine, for each device type pair, an engagement score based at least in part on the file sizes for the data files associated with the first device and the second device, wherein the engagement score represents a degree of usage of the first device concurrent with usage of the second device; and generate a recommendation message based on the engagement scores for one or more of the device type pairs.

BRIEF DESCRIPTION OF THE DRAWINGS

The description herein makes reference to the accompanying drawings wherein like reference numerals refer to like parts throughout the several views, and wherein.

DETAILED DESCRIPTION

According to the methods, systems, apparatuses, and computer programs that are discussed herein, recommendations can be made based on storage of information, such as data files, at a storage system. These recommendations are made using a model that includes usage information for devices that are used with the storage system across all users of the storage system. The usage information is based at least in part on data files, stored at the storage system, that are associated with specific types of devices. The amount of data stored for a particular device is utilized as a signal that indicates usage of the device by the user. When a user of the storage system uses two different types of devices, this is utilized as a signal indicating that the two devices are complementary. Additional factors related to the stored data can be utilized as signals in making the recommendations, such as whether the user has shared the data by granting third parties access to it. The recommendations can identify additional devices that a user would find useful, based on the identities of the devices that the user is currently using in conjunction with the storage system.

Figure 1:
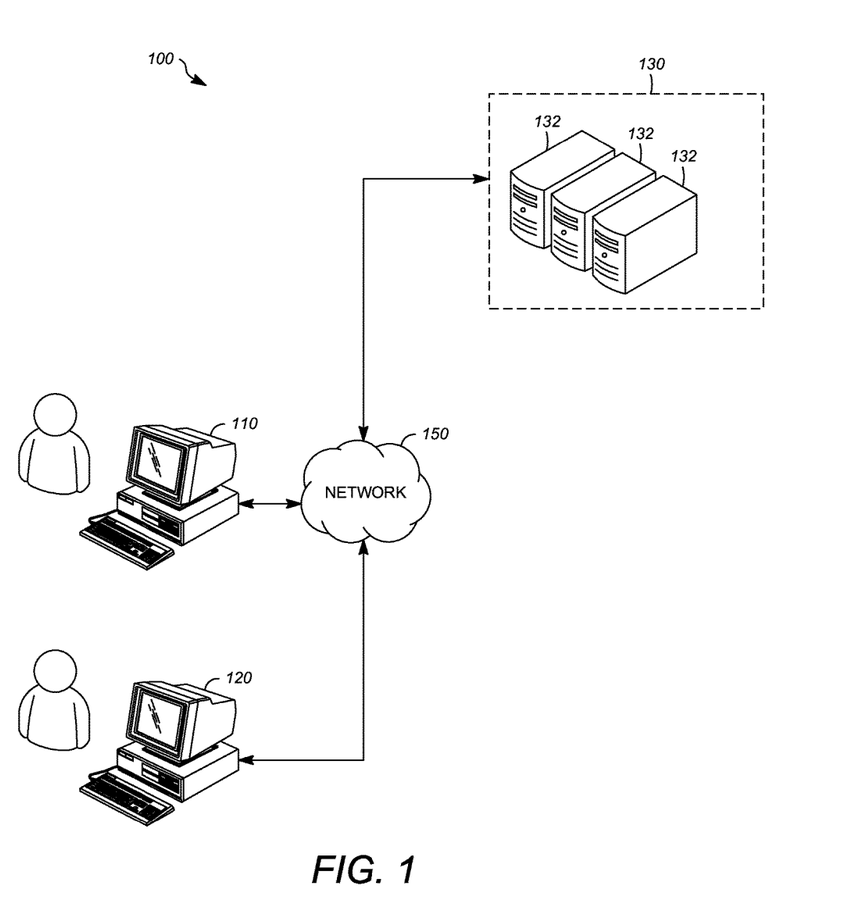
FIG. 1 is a block diagram showing an example of an environment in which a system for generating recommendations based on device usage can be implemented.

FIG. 1 shows an example of an environment 100 in which a system for generating recommendations based on device usage can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One or more of the hosted applications can be a storage system that is operable to implement storage and retrieval functions and output, for display to a user, a user interface that allows the user to store, browse, organize, retrieve, view, delete, and/or perform other operations with respect to objects such as files. The files can be arranged by the storage system in a hierarchical manner, such as a folder structure. Herein, files are discussed as examples of objects, and the disclosure herein is equally applicable to other types of objects, such as the folders of the hierarchical folder structure. The storage system can allow access to objects by a single user or by a group of designated users. The user interface for the storage system can be output by the application hosting service 130 for display at a device associated with the user, such as the user system 110, by transmission of signals and/or data from the application hosting service to the user system 110 that, when interpreted by the user system 110, cause display of the interface at the user system 110.

Figure 2:
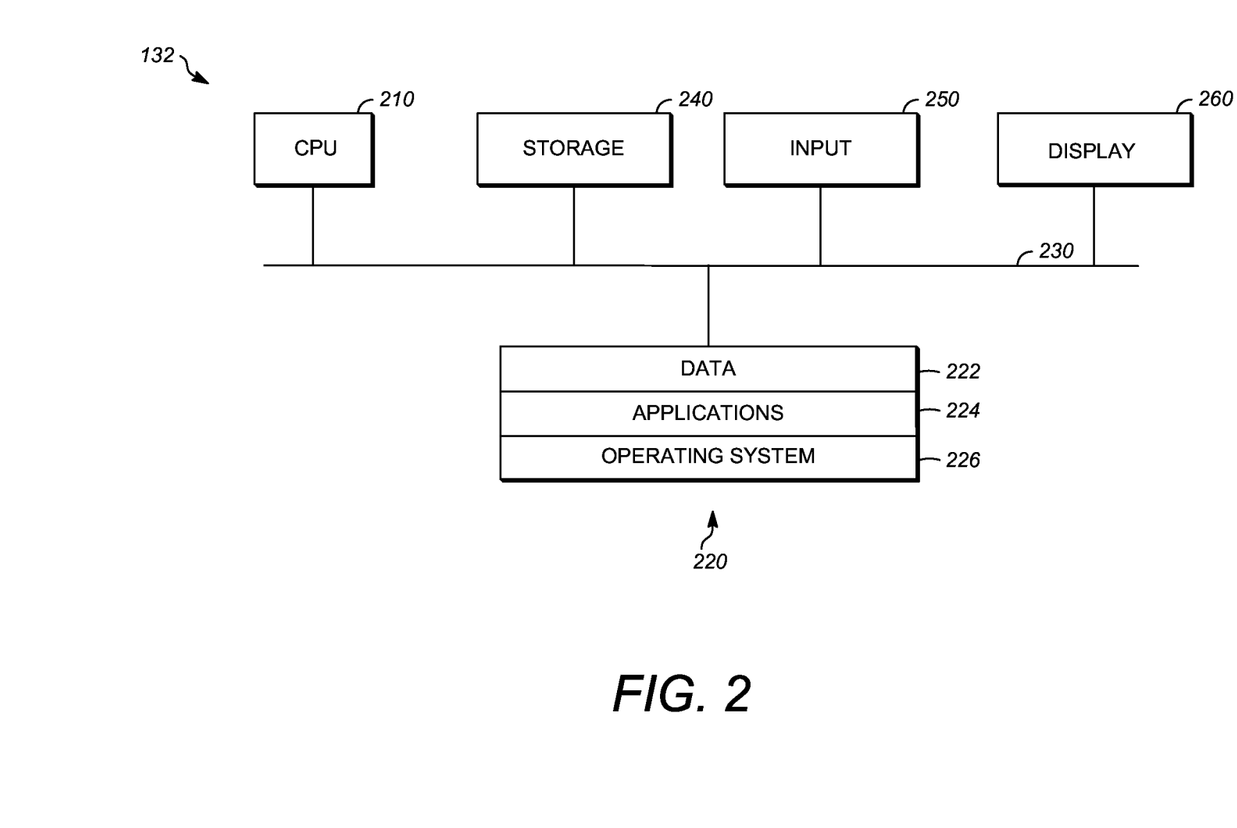
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
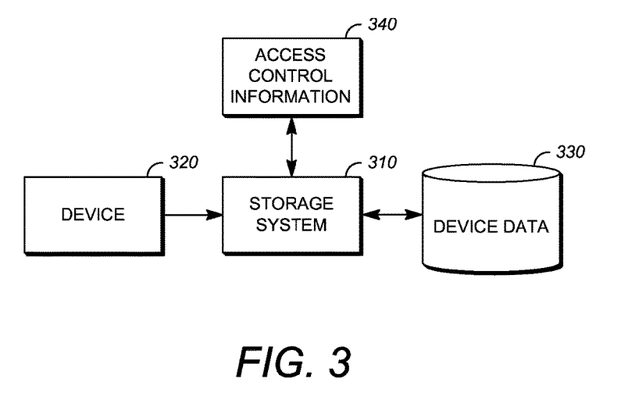
FIG. 3 is a block diagram showing operation of a storage system.

FIG. 3 is a block diagram showing a storage system 310. The storage system 310 can store files for each of a plurality of users, with each user having a separate account that is accessed using login credentials such as one or more of a username, a password, a certificate, a hardware device, a biometric indicator, or other credential. The term "user" refers to individuals who use the storage system 310 for purposes including storing, creating, editing, viewing, and/or sharing data.

In one implementation, the storage system 310 is an internet-accessible cloud-based storage system that can be accessed via an interface that is displayed by a remote computing device through a web browser application or a dedicated application. The users can manage their accounts in various ways, such as by controlling access to the files that they store at the storage system 310. As an example, a user could store a file and allow it to be accessed by any other person or entity (i.e. shared publicly). As another example, a user could store a file and allow it to be accessed by one or more specified persons or entities.

The storage system 310 can receive information from a device 320. The device 320 is a physical hardware device that is associated with one of the users of the storage system 310. The term "device" refers to any physical electronic device that a user utilizes in conjunction with the storage system 310. Each of the devices 320 can have a device type identifier that provides information that is sufficient to identify the device as belonging to a group of substantially identical devices. The device type identifier can be, for example, information identifying the manufacturer of the device and the model of the device. The device type identifier could be a non-unique identifier that is shared by devices of the same manufacturer and model, or could be a unique identifier that is specific to the device but includes information identifying the manufacturer and model and/or information from which the manufacturer and model of the device can be determined.

The device 320 is representative of a large number of devices that can be connected to the storage system 310. Devices are connected to the storage system 310 by any type of association between the storage system 310 and the device that causes the device to store data at the storage system 310. Such devices may be referred to herein as "connected devices." When a single user utilizes multiple devices with the storage system 310, those devices are referred to as "co-connected devices" for that user.

The device 320 is operable to store information at the storage system 310 by transmitting the information to the storage system 310 or by transmitting instructions to the storage system 310 that causes information to be created at the storage system 310. The information that is stored at the storage system 310 by the device 320 is referred to herein as device data 330. The device data 330 can be in any format, such as a device-specific format, and need not be interpretable by the storage system 310. The device data 330 is associated with information that identifies the device, such as the previously described device type identifier. The information that identifies the device can be stored with the device data, as a part of the device data, or separate from the device data. In one implementation, information that identifies the device is stored as metadata (i.e. attributes such as key value pairs that are stored along with data), which can be captured and maintained by the storage system 310. In another implementation, the information that identifies the device can be determined by interpreting information that is included in the device data 330. For example, the device data 330 can be a data file in a proprietary format with a file header that includes the information that identifies the device. This information can be extracted and used or stored for later use. The device data 330 can have a file size, expressed in any conventional metric, such as bytes.

The device data 330 includes information for each of a plurality (e.g. millions) of users of the storage system 310. The device data 330 includes the individual data files that are each stored in association with a particular user. As will be explained herein, the device data 330 can be utilized to make a number of determinations regarding each individual user and regarding the population of users of the storage system 310. The device data can be used to determine which devices are connected devices for a particular user. For example, when a particular device is connected and stores or creates the device data 330 at the storage system 310, the device can be identified, and the storage system 310 can store information, such as in a database, to indicate that the particular device is a connected device for the user The device data can also be used to determine an extent to which each user uses a particular type of device. Metrics that relate to the extent of use of a device include the file size of data files that are stored as device data 330 by a particular user for a particular device, and the frequency with which data files are stored or modified by a particular user for a particular device. By comparing these metrics for a particular user to similar metrics for the user population, inferences can be made regarding the particular user's affinity to a particular device. As one example, a usage metric for a device can be generated based on the file size of the data stored by a user for a device. This metric can be calculated based in part on how the file size of the data stored by the user compares to the file sizes of data stored by other users for the same type of device. Other types of metrics that measures a user's affinity for a device can be generated based on the device data 330.

The device 320 can transmit information and/or instructions to the storage system 310 via a network such as the internet. In one implementation, the device 320 includes hardware suitable to connect to a network to transmit the information to the storage system 310. An example of suitable hardware includes a wireless network interface controller operating according to the IEEE 802.11 (Wi-Fi) standard. In another implementation, the device 320 is not itself operable to transmit information to the storage system 310, but instead transmits information to a separate device by a wired or wireless connection using any suitable protocol such as, for example the Bluetooth standard or the Wi-Fi standard. As an example, the device 320 can be a peripheral device that is paired with a smart phone by a Bluetooth connection, and the smart phone is operable to receive the device data 330 from the device 320 using the Bluetooth connection and transmit the device data 330 to the storage system via a network connection.

The storage system 310 can allow third parties to access the device data 330, where "third parties" means any user, person, organization, or other entity that is not the owner of portion of the device data 330 being accessed. Allowing third parties to access the device data 330 is referred to herein as sharing the device data 330. Access to the device data 330 can be regulated based on access control information 340. The access control information 340 can be information that is stored by the storage system 310, and which describes how access can be provided to the device data. The storage system 310 can, based on the access control information 340, transmit the device data 330 to a third party upon receiving a request from the third party. In some implementations, the storage system 310 can transmit the device data to third parties without receiving a request (i.e. "push" the data). In some implementations, the storage system 310 is operable to generate information that is based on the device data 330, such as by excerpting, extracting, or summarizing the device data, and this is also considered sharing the device data 330.

Figure 4:
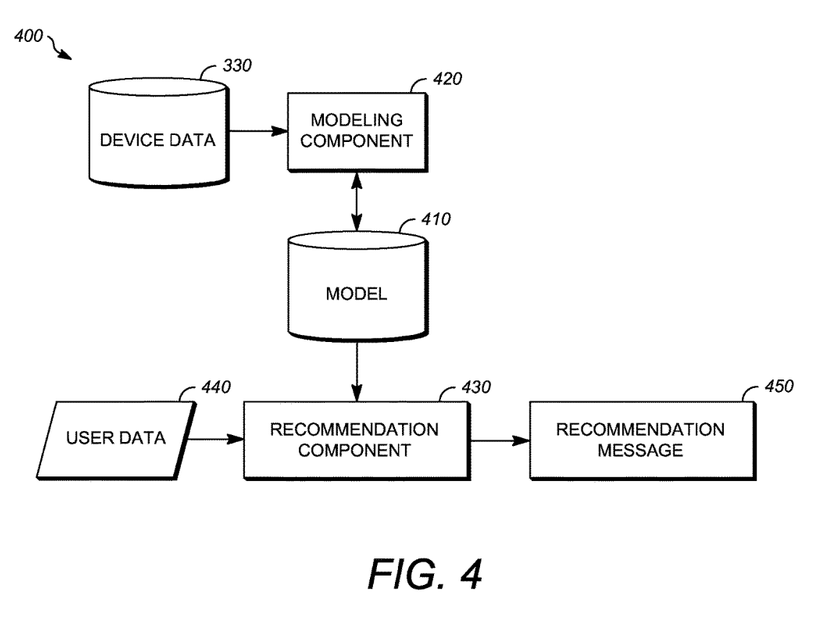
FIG. 4 is a block diagram showing a recommendation system.

FIG. 4 shows a recommendation system 400. The recommendation system 400 is operable to output recommendations that are based on a model 410. The recommendation system 400 includes a modeling component 420 that is operable to generate the model 410 as an output, using the device data 330 as an input. The model 410 is pre-computed by the modeling component 420 prior to the time at which recommendations are requested and made by the recommendation system 400. For example, the model 410 can be generated by the modeling component 420 periodically, such as once per day or once per week.

The model 410 is generated based on device usage characteristics for the devices 320, with the device usage characteristics being determined based on the device data 330. The device usage characteristics can be utilized to determine user-to-device engagement, which refers to the degree to which a particular user utilizes particular device and/or the data generated by the device. Thus, engagement can be modeled as increasing in correspondence to any or all of the time spent using the device, regularity of usage of the device, and frequency and extent of access, sharing, propagation or other use of the data generated by the device. Thus, even if device usage were steady over time, if the user increases the extent to which the data generated by the device is shared or otherwise propagated, user-to-device engagement could be considered to increase accordingly. As previously noted data file size and frequency of storage or modification of data files for a particular device are examples of indicators of user-to-device engagement.

The term user-to-device engagement score refers to any numeric value representing user-to-device engagement, typically with higher scores representing higher degrees of engagement. For example, the user-to-device engagement score can be determined by comparing usage characteristics for a particular device by a particular user to usage characteristics for that device across the population of devices. The resulting user-to-device engagement score would be high if the user's level of engagement is high as compared to average or median engagement levels for that device across the population of users and the resulting user-to-device engagement score would be low if the user's level of engagement is low as compared to average or median engagement levels for that device across the population of users.

Usage characteristics for all of the connected devices of all of the users of the storage system 310 can be incorporated in the model. To construct the model, device type pairs are defined that each include a first device and a second device having different device types. The model can include values for device type pairs corresponding to every possible pair of the connected devices. The model 410 captures system-wide device connection and device usage values, in the context of other devices that have been connected. The values can be aggregate system-wide engagement values that each represent an expected engagement value for a first device whenever a second device is also connected (i.e. co-connected). Thus, the model can include, for each device type pair, an engagement score based at least in part on the file sizes for the data files associated with the first device and the second device of the device type pair, where the engagement score represents a degree of usage of the first device concurrent with usage of the second device. As will be explained further herein, recommendation messages are generated based on the engagement scores for the device type pairs.

One way to express the model 410 is in the form of a matrix that includes these values for every possible pair of the connected devices. The model 410 can be expressed in other forms, as will be understood by persons of skill in the art. When a recommendation is requested, these values are utilized as a basis for generating the recommendation. In particular, the model 410 can be utilized to generate a ranked list of recommended devices based on information about the user and the user's connected devices. Additional steps such as applying filters, exclusions, or exceptions can be performed prior to generating a recommendation that will be output for display to the user in the form of a recommendation message, as will be explained herein.

In one implementation, the model 410 is represented by an upper triangular matrix, where values are populated only in the top half of the matrix. Rows and columns both represent devices, where the $n^{th}$ row and the $m^{th}$ column represents the aggregate system-wide engagement value for device n whenever device m was also connected.

Figure 5:
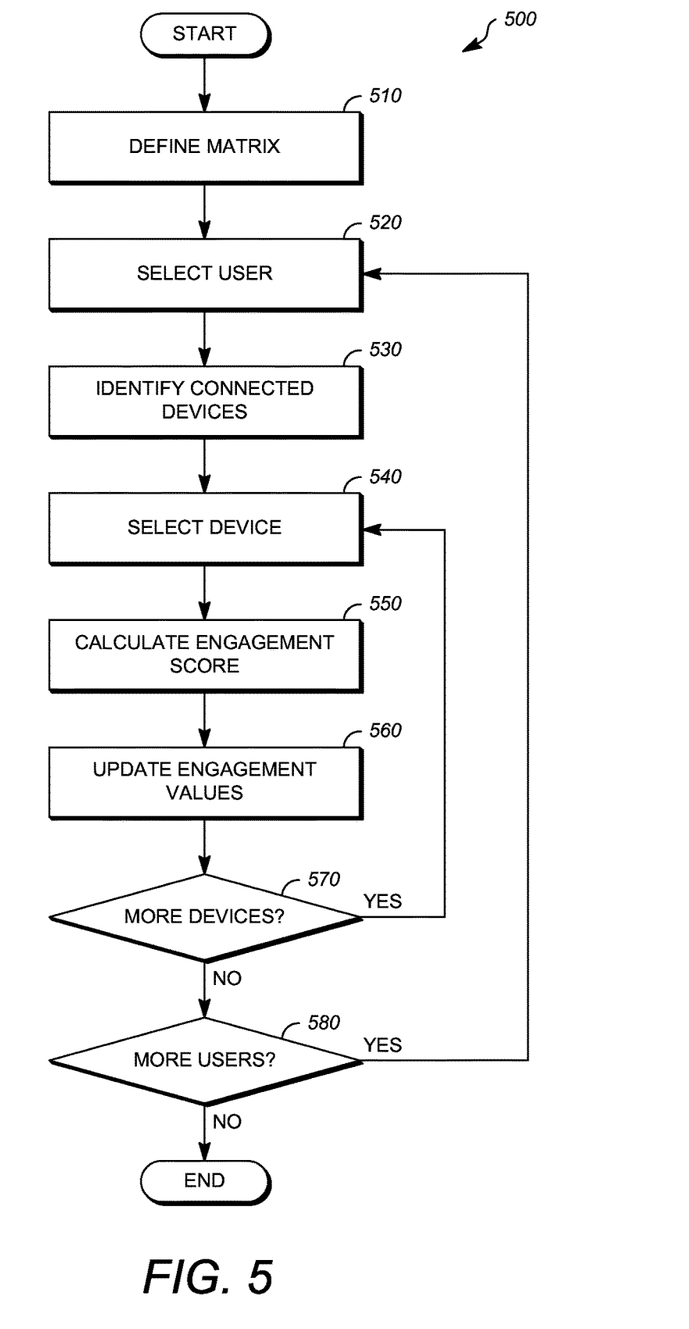
FIG. 5 is a flowchart showing an example of a process for generating a recommendation model.

FIG. 5 is a flowchart showing a first example of a process 500 for generating the model 410. The operations described in connection with the process 500 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 500 can be embodied as a non-transitory computer readable storage medium including program instructions executable by one or more processors that, when executed, cause the one or more processors to perform the operations. For example, the operations described in connection with the process 500 could be stored at the memory 220 of one of the server computers 132 and be executable by the CPU 210 thereof.

In operation 510 a matrix is defined to represent the model 410. The matrix can include a number of rows equal to the number of unique device types that are connected to the storage system, and a number of columns that is equal to the number of rows. Each value in the matrix corresponds to an engagement value for a device pair of devices having different devices types, namely a first device, represented by rows, when a second device, represented by columns, is also utilized (i.e. connected) by the user. All of the values in the matrix may initially be set to zero. The matrix may be represented as a sparse matrix for memory efficiency.

A series of operations are performed for every user of the storage system 310. In operation 520 a user is selected. In operation 530 the selected user's connected devices are identified. In operation 540 a device is selected from the user's connected devices. In operation 550 a user-device engagement value is computed for the selected device. The user-device engagement score can be computed based on the file size of data files stored at the storage system 310 by the user for the selected device and, optionally, based further on whether that data is shared with third parties. Thus, the user-device engagement score increases as more data is written to the user's account at the storage system by the device and can also increase as that data is shared with more people.

In operation 560, the user-device engagement score for the selected device is used to update the engagement values. For example, the row in the matrix that corresponds to the selected device is identified, and within that row, the user-device engagement value for the selected device is added to the currently existing value in each row that corresponds to another one of the user's connected devices. In operation 570, if additional connected devices remain to be processed for the selected user, the process returns to operation 540. Once all of the selected user's connected devices have been considered, the process advances to operation 580 where, if more users remain, the process returns to operation 520. Once all of the users have been considered, the process ends.

Figure 6:
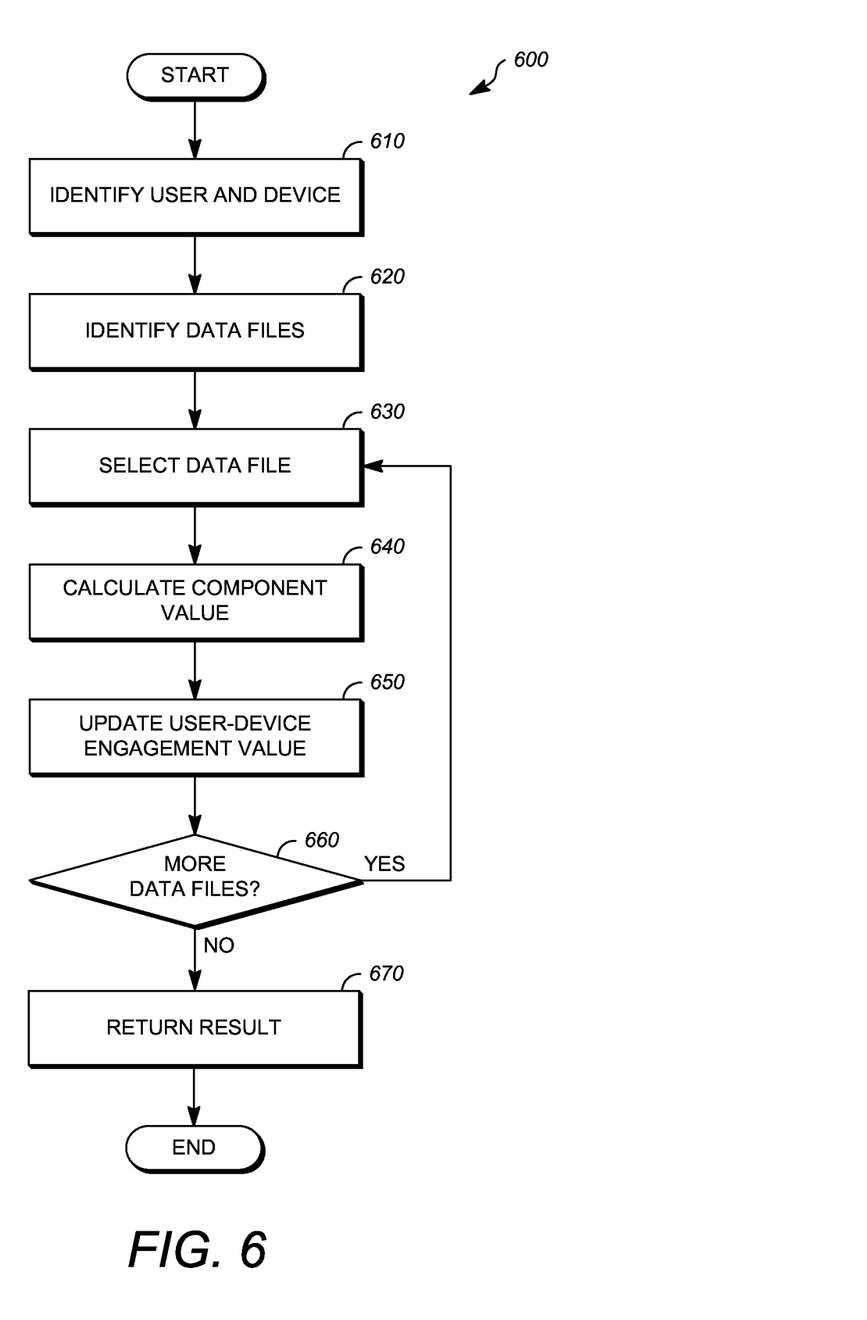
FIG. 6 is a flowchart showing an example of a process for generating a user-device engagement score.

FIG. 6 is a flowchart showing a first example of a process 600 for generating a user-device engagement score for a particular device. The process 600 is an example of a process that can be utilized to generate the user-device engagement score at operation 550 of the process 500. The operations described in connection with the process 600 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 600 can be embodied as a non-transitory computer readable storage medium including program instructions executable by one or more processors that, when executed, cause the one or more processors to perform the operations. For example, the operations described in connection with the process 600 could be stored at the memory 220 of one of the server computers 132 and be executable by the CPU 210 thereof.

In operation 610, an input is received that specifies a particular user U and a particular device D. When the process 600 is used in conjunction with the process 500, the user can be the selected user from operation 520, and the device can be the selected device from operation 540. A variable X is defined to accumulate the user-device engagement value for the user and device specified at operation 610. At operation 620, all of the data files created by device D on behalf of user U are identified. This can be performed, for example, by obtaining from the storage system 310 the device data 330 that is associated with the user U and the device D.

The data files identified at operation 620 are processed individually to determine a component value for each data file, representing a contribution to the user-device engagement score based on the user's act of storing that particular data file at the storage system 310. At operation 630, one of the data files identified at operation 620 is selected for processing. At operation 640, the component value is calculated for the selected data file. The component value is based on the file size of the selected data file. Optionally, additional factors can be included in calculating the component value. In a simple implementation, the component value can be the file size itself alone without modification. In another implementation, the file size can be scaled (linearly or non-linearly) based on the extent to which the data file is shared with others. As an example, the storage system 310 can be queried to determine the number of third party persons and/or entities with whom the selected file is shared. This can be done, for example by the storage system 310 using the access control information 340. The file size for the selected file is then multiplied by the number of third party persons and/or entities with whom the selected file is shared, and the result is used as the component value. Other calculations of the component value can be made based on the file size of the selected file, the number of third party persons and/or entities with whom the selected file is shared, and/or other factors that indicate a user's extent of engagement with the device D. At operation 650, the user-device engagement value X is updated based on the component value, such as by adding the component value to the user-device engagement value X.

At operation 660, the process returns to operation 630 if more data files remain to be processed or the process advances to operation 670 if all of the data files have been processed. At operation 670, the user-device engagement score X for the user and device pair identified at operation 610 is returned as a result of the process 600. Optionally, the user-device engagement score X can be scaled or normalized when incorporated in the model 410, to prevent the devices from being underweighted or overweighted in the model 410 based on the typical data file sizes that are generated by the device. For instance, a fitness monitor device might store relatively small file size text-based data files, while a digital camera may store very large file size high-resolution digital images.

With further reference to FIG. 4, the model 410 is utilized by a recommendation component 430. The function of the recommendation component 430 is to identify devices that a user will find useful, based on the devices that the user currently uses. Thus, the recommendations will be directed to complementary devices, based on information from the model 410 that indicates that other users have used those devices together, as well as the level of engagement of those users with those devices.

The recommendation component 430 receives user data 440 as an input. The user data 440 can be based on the device data 330, such as the device data 330 that is associated with the user (e.g. stored by the user). In one implementation, the user data 440 is a list of the device type identifiers for devices that the user has used with the storage system 310, such as devices that have stored data at the storage system 310 on behalf of the user. The user data 440 can further include information regarding the individual data files stored at the storage system 310 on behalf of the user, such as the number of data files stored by each device and/or the file sizes of the data files stored at the storage system 310 on behalf of the user.

For each of the user's connected devices, the recommendation component 430 accesses the model 410 and determines the user-device engagement scores for that device (a first device) when another device (a second device) is also connected. If the model 410 is in the form of a matrix as previously described, this is done by finding the row corresponding to the device, and then looking up the scores in that row for other devices. For each of these other devices, a device recommendation score is determined by based on the user-device engagement scores for that device (second device) with respect to the user's co-connected devices (first devices). As one example, the individual user-device engagement scores could be averaged to generate the device recommendation score. As another example, the individual user-device engagement scores could be summed to generate the device recommendation score. In some implementations, the device recommendation score can be scaled based on information associated with the user, such as the file size of data files stored by the user at the storage system for each of the user's devices (first devices) The term "device recommendation score" refers to a score assigned to a device in a given recommendation scenario (i.e., for one user, and given the user's set of connected devices). The device recommendation score can be a function of the user, the user's co-connected devices, and the model 410. The device recommendation scores are compiled into a scored list of devices, which can be a list of all devices in the system and their associated device recommendation score for a given recommendation scenario.

Subsequent to generation of the scored list of devices, a subset of those devices can be selected to be incorporated in a recommendation message 450 that is output for display to the user by the recommendation component 430. The recommendation message 450 includes information that identifies one or more devices that the recommendation component 430 has identified as being potentially useful to the user. The recommendation message 450 can be presented to a user (e.g. output for display at a display device) in any of a number of suitable formats, and in many different contexts. In one implementation, the recommendation message 450 can be an advertisement that is output for display to the user in a user interface that is generated by the storage system 310. In some implementations, the recommendation message 405 can include an explanation as to why the recommendation is being made, such as by stating that "this device is popular when Device 2 is also connected."

In one implementation, one or more of the top-ranked devices from the scored list of devices can be selected for incorporation in the recommendation message 450. For example, the top device could be selected, or the top three devices could be selected. In another implementation, all devices that have a ranking score that exceeds a threshold can be selected for incorporation in the recommendation message 450. The threshold can be pre-determined or can be determined dynamically, such as by a clustering algorithm. Other factors can be utilized to filter the list or exclude certain results, such as other information associated with the user. For example, results can be excluded if they correspond to devices that the user already owns, or based on other information indicating that the user is not interested in a particular device. Combinations of these and/or other methods can be utilized to select the subset of devices from the ranked list of recommended devices for incorporation in the recommendation message 450.

Subsequent to viewing the recommendation message 450, the user may take actions that the storage system 310 can track as feedback signals, and these feedback signals can be used as additional factors that are incorporated in the user-device engagement scores in the model 410. As one example, if the recommendation message includes a link to a particular device, the user's act of clicking the link is a positive signal that can be used to increase the user-device engagement score. As another example, if a particular device is recommended to the user and is later connected to the storage system by the user, this is a positive signal that can be used to increase the user-device engagement score. Different types of feedback can be accorded different weight. For example, connecting a device after it is recommended can be given much greater weight than clicking a link.

Figure 7:
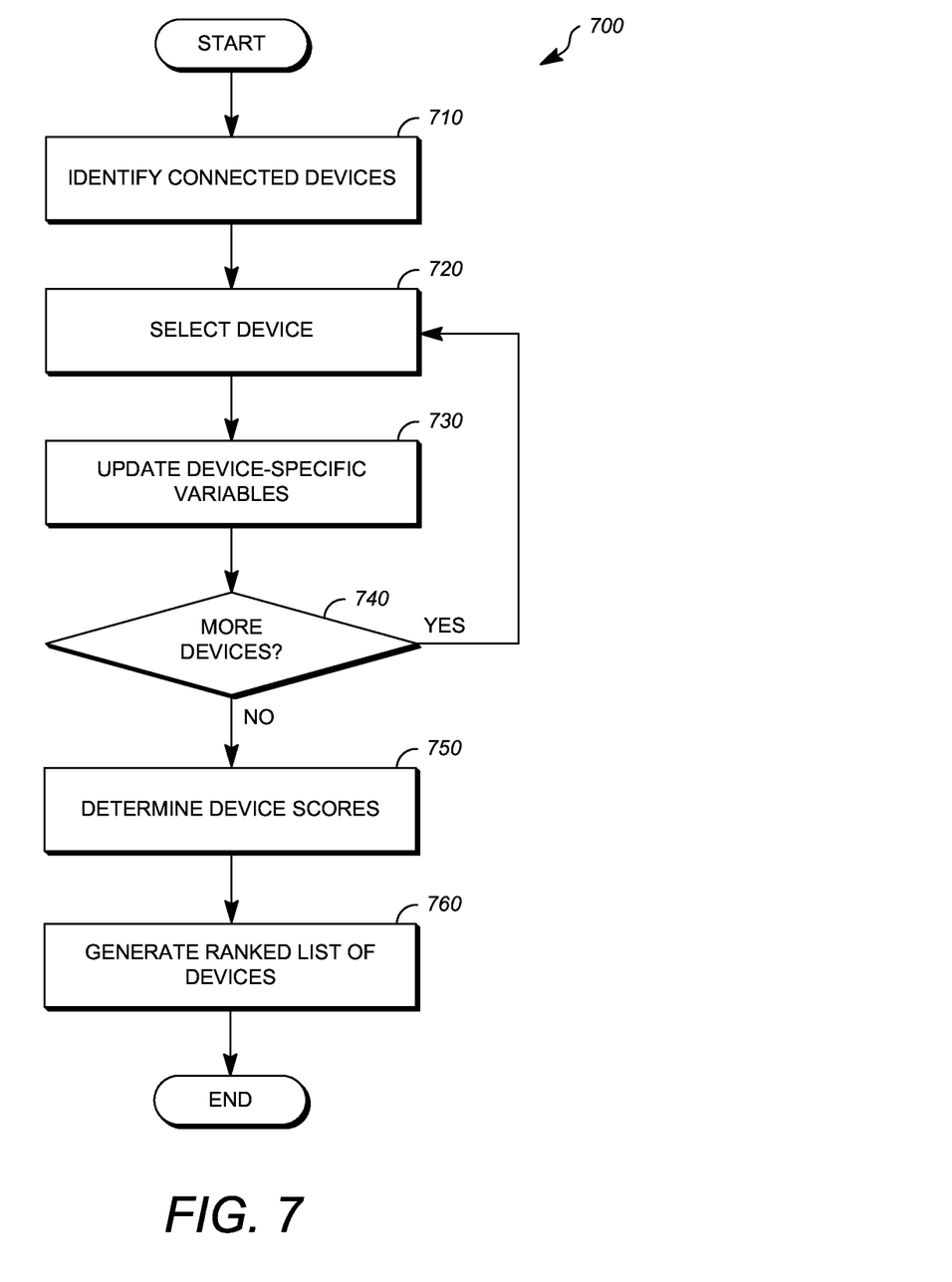
FIG. 7 is a flowchart showing an example of a process for generating a scored list of devices.

FIG. 7 is a flowchart showing a first example of a process 700 for generating the scored list of devices by the recommendation component 430. The process 700 is an example, and other processes can be utilized to generate the scored list of devices by the recommendation component 430 using the model 410 and the user data 440. The operations described in connection with the process 700 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of one of the server computers 132 and be executable by the CPU 210 thereof.

In operation 710 the user's connected devices are identified based on, for example, the user data 440. One of the connected devices is selected at operation 720, for analysis of the portion of the model 410 (e.g. the row in the matrix example given previously) that represents the aggregate system-wide engagement values for the selected device n when other specified devices (e.g. corresponding to columns in the matrix example given previously) are also connected. At the first iteration of operation 720, device-specific variables are initialized for each of the other device types in the model to collect the user-device engagement scores for pairs of the selected device and every other device in the model. These variables are updated at operation 730 to include the engagement value from the model 410 corresponding to the selected device (first device) when the other device (second device) for the respective device-specific variable is also connected. At operation 740, the process returns to operation 720 if more connected devices remain for analysis, or advances to operation 750. At operation 750, a device score is determined for each device based on the device-specific variables, such as by calculating an average engagement score by dividing the number collected in each device-specific variable by the number of the users connected devices (e.g. number of iterations of operation 720), or by utilizing the value of the device specific variable as a basis for the device score without averaging. At operation 760, the device scores are compiled as the ranked list of recommended devices, which is returned as an output of the process 700, and the process ends.

Figure 8:
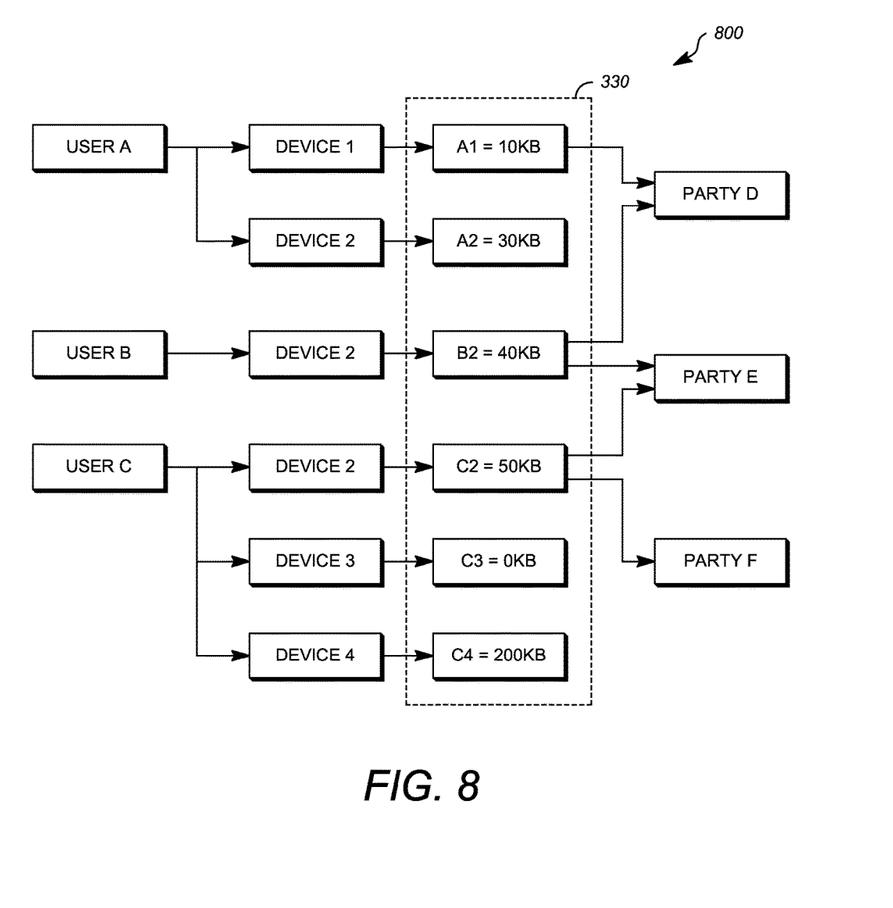
FIG. 8 is an illustration of an example scenario in which device recommendations can be generated.

FIG. 8 shows an example scenario 800 in which device recommendations can be generated. In this example there are four known device types, which are represented by Device 1, Device 2, Device 3, and Device 4. The model 410 that will be discussed in this example is generated as a matrix having 4 rows and four columns, as shown in Table 1 below.

Three users, identified as User A, User B, and User C, have each connected one or more devices to the storage system 310. User A has connected Device 1 and Device 2 to the storage system. User B has connected Device 2 to the storage system 310. User C has connected Device 2, Device 3, and Device 4 to the storage system 310.

The devices have stored data files at the storage system 310 as device data 330. Data file A1 was stored on behalf of user A by Device 1, and has a file size (which can be an aggregate size across multiple files) of 10 kilobytes. Data File A1 is shared with party D. The user device engagement score component for data file A1 is added to row 1 of the model in each column corresponding to one of user A's connected devices, namely columns 1 and 2. The engagement score component in this example is calculated by the formula $X=S*(1+N)$, where X represents the engagement score component value, S represents the size of the data file (here, 10 kilobytes), and N represents the number of parties with whom the data file is shared (here, 1). This yields a component score of 20, which is added to the values in columns 1 and 2 of row 1.

Data file A2 was stored on behalf of user A by Device 2, has a file of 30 kilobytes, and is shared with no third parties. The engagement score component for data file A2 is 30, which is added to the values in row 2, columns 1 and 2.

Data file B2 was stored on behalf of user B by Device 2, has a file of 40 kilobytes, and is shared with Party D and Party E. The engagement score component for data file B2 is 120, which is added to the value in row 2, column 2.

Data file C2 was stored on behalf of user C by Device 2, has a file of 50 kilobytes, and is shared with Party E and Party F. The engagement score component for data file C2 is 150, which is added to the values in columns 2, 3, and 4 of row 2, since User C has devices 2, 3, and 4 connected.

User C has connected Device 3, but no data has been stored for Device 3. This results in the engagement score component for data file C3 being zero.

Data file C4 was stored on behalf of user C by Device 4, has a file of 200 kilobytes, and is not shared. The engagement score component for data file C4 is 200, which is added to the values in columns 2, 3, and 4 of row 4.

TABLE 1

| Device | 1 | 2 | 3 | 4 |
| --- | --- | --- | --- | --- |
| 1 | 20 | 20 | 0 | 0 |
| 2 | 30 | 30 + 120 + 150 | 150 | 150 |
| 3 | 0 | 0 | 0 | 0 |
| 4 | 0 | 200 | 200 | 200 |

The model defined above is then used to generate recommendations, as explained with respect to the recommendation component 430. For example, consider a scenario where devices recommendations are to be shown to User B. User B only has Device 2 connected. The 2nd row in the model is referenced, and all other devices other than Device 2 are considered for recommendation. This allows generation of a list of recommended device that including Devices 1, 3, and 4 based on their scores of 30, 150, and 150, respectively.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a subcombination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
   receiving, at a storage device, a plurality of data files that each have a file size and that each are associated with a respective device that corresponds to one of a plurality of device types;
   defining device type pairs that each include a first device and a second device used concurrently by a respective user, the first device and the second device having different ones of the plurality of device types;

determining, by one or more computing devices and for each device type pair, an engagement score based at least in part on the file sizes for the data files associated with the first device and the second device, wherein the engagement score represents a degree of usage of the first device concurrent with usage of the second device by the respective user; and generating, by the one or more computing devices, a recommendation message based on the engagement scores for one or more of the device type pairs.

2. The method of claim 1, wherein determining the engagement score is based in part on a sharing factor that represents a degree to which the data files associated with at least one of the first device or the second device are shared with other parties.

3. The method of claim 2, wherein the sharing factor is based at least in part on a number of the other parties with whom the data files are shared.

4. The method of claim 1, wherein the data files are each generated by the respective device.

5. The method of claim 1, wherein the storage device is part of a remotely accessible server-based storage system.

6. The method of claim 5, wherein the respective user is associated with a respective user account at the remotely accessible server-based storage system.

7. A non-transitory computer-readable storage device including program instructions executable by one or more processors that, when executed, cause the one or more processors to perform operations, the operations comprising:

receiving, at a storage device, a plurality of data files that each have a file size and that each are associated with a respective device that corresponds to one of a plurality of device types;

defining device type pairs that each include a first device and a second device used concurrently by a respective user, the first device and the second device having different ones of the plurality of device types;

determining, for each device type pair, an engagement score based at least in part on the file sizes for the data files associated with the first device and the second device, wherein the engagement score represents a degree of usage of the first device concurrent with usage of the second device by the respective user; and generating a recommendation message based on the engagement scores for one or more of the device type pairs.

8. The non-transitory computer-readable storage device of claim 7, wherein determining the engagement score is based in part on a sharing factor that represents a degree to which the data files associated with at least one of the first device or the second device are shared with other parties.

9. The non-transitory computer-readable storage device of claim 8, wherein the sharing factor is based at least in part on a number of the other parties with whom the data files are shared.

10. The non-transitory computer-readable storage device of claim 7, wherein the data files are each generated by the respective device.

11. The non-transitory computer-readable storage device of claim 7, wherein the storage device is part of a remotely accessible server-based storage system.

12. The non-transitory computer-readable storage device of claim 11, wherein the respective user is associated with a respective user account at the remotely accessible server-based storage system.

13. An apparatus, comprising:

one or more processors; and one or more memory devices for storing program instructions used by the one or more processors, wherein the program instructions, when executed by the one or more processors, cause the one or more processors to:

receive, at a storage device, a plurality of data files that each have a file size and that each are associated with a respective device that corresponds to one of a plurality of device types, define device type pairs that each include a first device and a second device used concurrently by a respective user, the first device and the second device having different ones of the plurality of device types, determine, for each device type pair, an engagement score based at least in part on the file sizes for the data files associated with the first device and the second device, wherein the engagement score represents a degree of usage of the first device concurrent with usage of the second device by the respective user, and generate a recommendation message based on the engagement scores for one or more of the device type pairs.

14. The apparatus of claim 13, wherein the program instructions further cause the one or more processors to determine the engagement score based in part on a sharing factor that represents a degree to which the data files associated with at least one of the first device or the second device are shared with other parties.

15. The apparatus of claim 14, wherein the sharing factor is based at least in part on a number of the other parties with whom the data files are shared.

16. The apparatus of claim 13, wherein the data files are each generated by the respective device.

17. The apparatus of claim 13, wherein the storage device is part of a remotely accessible server-based storage system.

18. The apparatus of claim 17, wherein the respective user is associated with a respective user account at the remotely accessible server-based storage system.

* * * * *